United States Patent [19]

McGovern et al.

[11] Patent Number: 5,080,792
[45] Date of Patent: Jan. 14, 1992

[54] APPARATUS AND METHOD FOR SEPARATING FLUIDS

[75] Inventors: John J. McGovern; Davis L. Taggart; Boyd E. Cabanaw, all of Tulsa, Okla.

[73] Assignee: Amoco Corporation, Chicago, Ill.

[21] Appl. No.: 562,185

[22] Filed: Aug. 3, 1990

[51] Int. Cl.⁵ .............................................. E01D 45/12
[52] U.S. Cl. .................. 210/512.1; 209/144; 209/211
[58] Field of Search ..................... 210/512.1; 209/144, 209/211

[56] References Cited
U.S. PATENT DOCUMENTS

4,394,138 7/1983 Scarling ................. 210/512.1

Primary Examiner—Frank Sever
Attorney, Agent, or Firm—Marcy M. Lyles

[57] ABSTRACT

Apparatus and method for separating flowing immiscible fluid phases of different specific gravities includes an elongate conduit having an inlet for receiving incoming fluids, an outlet for discharging separated fluids, a first end and an open second end. The outlet is formed by the open second end. The inlet is longitudinally spaced away from the outlet on the elongate conduit. A flow assembly is provided for creating cyclonic flow of the fluid from the inlet through the outlet of the elongate conduit in order to centrifugally separate the fluids so that that the separated fluids flow concentrically through the outlet. The separator can include an outer tank surrounding the elongate conduit.

20 Claims, 7 Drawing Sheets

APPARATUS AND METHOD FOR SEPARATING FLUIDS

BACKGROUND OF THE INVENTION

1. Field of the Invention

This invention relates to apparatus and method for separating immiscible fluid phases of different specific gravities and, more particularly, to such apparatus and method which centrifugally separate flowing immiscible fluid phases.

2. Setting of the Invention

In the oil and gas industry, oil/water separation vessels have been designed in numerous geometries in an attempt to improve oil/water separation efficiency. Unfortunately, volumetric utilization efficiencies as low as 19% have been observed with standard tank designs using laboratory tracer studies. Even the best tank designs often achieve utilization efficiencies of less than about 60%.

One tank design that has a relatively high volumetric utilization efficiency is a downflow, center-outlet vortex separator developed by Amoco Production Company. Please see U.S. Pat. No. 4,619,771. This vortex separator achieves relatively high volumetric utilization efficiency provided the flow rate is within a relatively narrow range.

A similar, known cyclonic device that uses centrifugal force to separate oil and gas is described in *Surface Production Operations*, Volume I, Arnold and Stewart, Gulf Publishing: 1986. The Arnold and Stewart device uses downflow, i.e., the inlet is at the top of the vessel, and includes a cyclonic chimney or a tangential fluid race. Gas exits from the top of the inner cyclonic chimney and the oil exits out the bottom of the outer tank, i.e., the separated oil and gas exit at opposite ends of the chimney and the gas exits at the same end of the chimney as the inlet; therefore the separating gas must flow countercurrent to the bulk stream.

Another known device which uses a cyclonic flow field to separate two liquids is commonly called a hydrocyclone. In the known hydrocyclones, the coalesced oil stream flows in a direction opposite or countercurrent to the direction of the bulk water flow, i.e., the separated overflow oil and underflow water streams exit the conventional hydrocyclone at opposite ends of the hydrocyclone. The oil exits the hydrocyclone at the same end as the inlet. As a result of this countercurrent flow pattern, the inlet feed pressure, the under flow back pressure, and the overall pressure drop between the inlet and outlet streams are all relatively large. Also, the known hydrocyclones operate at an angular velocity which results in large shear forces in the fluid. The large shear forces can prevent coalescence of the oil and can actually break the oil into smaller droplets, which are then more difficult to force to the center of the hydrocyclone and thus be separated.

In view of the previously discussed problems, there is a need for an apparatus and method for separating flowing immiscible fluid phases of different specific gravities, such as oil and water, which will (a) have a high volumetric utilization efficiency; (b) take advantage of the bulk fluid velocity in achieving separation; (c) facilitate coalescence of the dispersed oil phase or similar dispersed fluid phase; (d) be mechanically simple and may be inexpensively fabricated; (e) operate efficiently at high and low flow rates and over a wide range of flow rates; (f) be easily retrofitted to an existing separating system and/or tank; (g) have the coalesced oil stream and the bulk water stream flow in the same or concurrent direction and exit from the same end of the separator so that the inlet feed pressure, outlet back pressure, and overall pressure drops between the inlet and outlet streams are significantly less than in known hydrocyclones; and (h) create smaller shear forces within the separator in order to provide better coalescence and separation.

SUMMARY OF THE INVENTION

The present invention is contemplated to overcome the foregoing deficiencies and meet the above-described needs. For accomplishing this, the present invention provides a novel and improved apparatus and method for separating flowing immiscible fluid phases of different specific gravities. The apparatus or separator includes an elongate conduit and a flow device. The elongate conduit has an inlet for receiving incoming fluids, an outlet for discharging separated fluids, a first end, and an open second end forming an outlet. The inlet is longitudinally spaced away from the outlet on the conduit. The flow device creates cyclonic flow of the fluid from the inlet through the outlet of the elongate conduit in order to centrifugally separate the fluids, so that the separated fluids flow concentrically through the outlet.

The elongate conduit can include a hollow frusto-conical accelerator. The larger end of the accelerator adjoins the first end of the elongate conduit. The smaller end of the accelerator adjoins the second end of the elongate conduit. A cylindrical neck is connected to and extends from the smaller end of the accelerator. A cylindrical base is connected to the larger end of the accelerator and is about equal in diameter to the larger end of the accelerator.

The method for separating flowing immiscible fluid phases of different specific gravities includes: providing an elongate conduit having an inlet at the first end and an outlet at the second end; cyclonically flowing the fluid from the inlet through the outlet of the elongate conduit in order to centrifugally separate the fluid phases; and concentrically discharging the separated fluid phases through the outlet. The cyclonically flowing step provides for connecting an inlet conduit about tangentially to the elongate conduit in order to direct fluid flowing from the inlet about tangentially to the inside of the elongate conduit.

It is contemplated that the present invention will provide significant advantages over known separators. For example, since the coalesced oil stream and bulk water stream of the present invention flow in the same or concurrent direction, the inlet feed pressure, the outlet feed back pressure, and the overall pressure drop between the inlet and outlet streams are significantly less than in the known hydrocyclones. For example, a typical pressure drop across a known hydrocyclone is 150 psi whereas the typical pressure drop across the prototypes of the present invention is 1-2 psi. This is because the oil and water both leave the same end of the elongate conduit of the present invention. The known hydrocyclones require back pressure in order to force the separated liquids out opposite ends of the hydrocyclone. The lower feed pressure and pressure loss required by the present invention also mean that less pumping energy is required to operate the separator. Furthermore, the lower pressure drop creates smaller shear forces in the swirling fluid and therefore the breaking up of the oil droplets by shear forces is reduced or eliminated.

It is also contemplated that the separator of the present invention can be used as an independent coalescing or coalescing and separating device, i.e., when the elongate conduit is not enclosed in a tank, regardless of the type of downstream tank, separator, or processing system that may be present to separate the coalesced oil stream. The separator of the present invention may be used as an independent separating device, i.e., the elongate conduit is not enclosed in a tank, which receives an oily water feed stream and coalesces and separates the feed stream into an oily outlet stream that contains a higher oil concentration than the feed water stream and a cleaned water stream that contains a lower oil concentration than the feed water stream.

DETAILED DESCRIPTION OF THE PREFERRED EMBODIMENTS

The present invention is an apparatus and method for separating flowing immiscible fluid phases of different specific gravities. Such fluids will be described hereinafter as oil and water; however, it should be understood that any other disparate fluids can be separated hereby.

Figure 1:
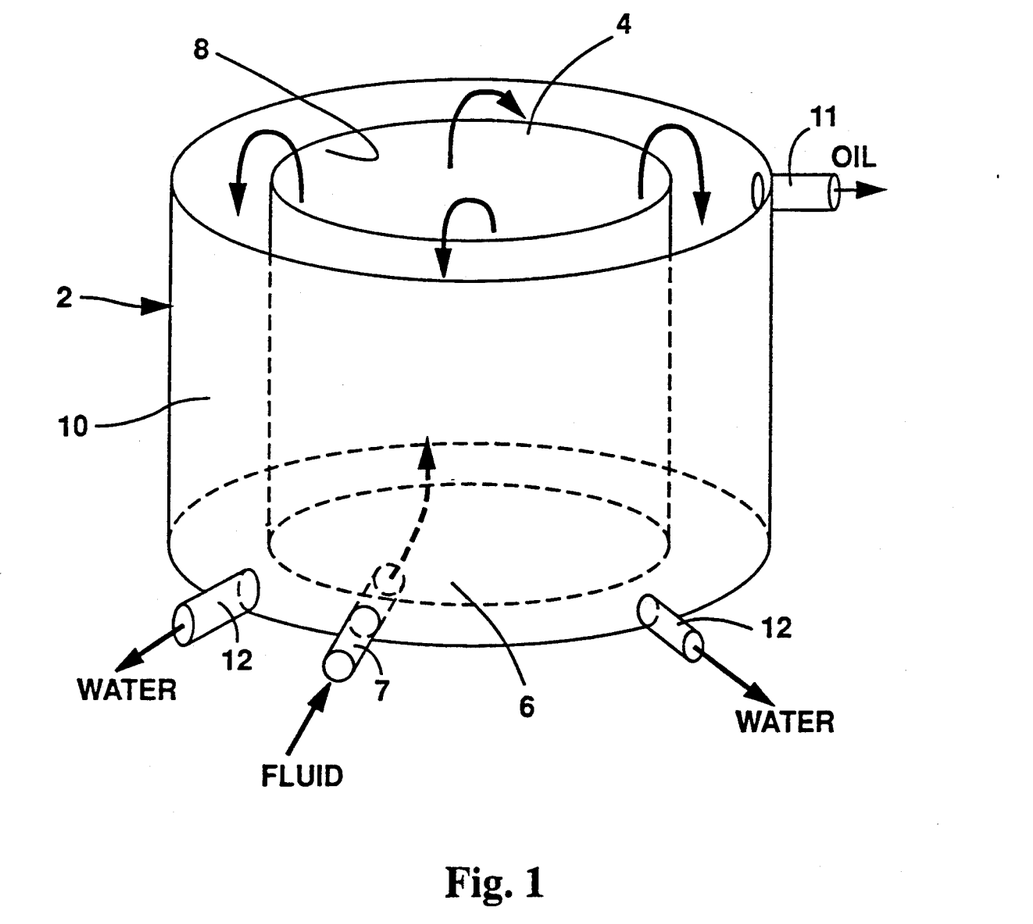
FIG. 1 is a schematic perspective view of an embodiment of a radial flow separator of the present invention.

One embodiment of the present invention combines the advantages of the radial flow, vertical downflow, and vertical upflow separators in order to achieve oil removal efficiencies theoretically approaching 100%. The preferred embodiment of this basic design is shown in FIG. 1 wherein a vertical vessel 2 has a cylindrical baffle 4 sealed at a bottom 6 of the vessel 2. Fluid is introduced through an inlet 7 at the bottom of the vessel 2 and into the interior of the baffle 4. The inlet 7 can be perpendicular or can tangentially introduce the fluid. The bottom 6 of the vessel 2 could serve as a splash plate type flow distributor thereby eliminating problems associated with other types of distributors. The fluid flows upward through the cylindrical baffle 4, then spills over an overflow weir 8 in the manner of a vertical upflow separator.

Because the oil rises in the same direction as the bulk fluid flow, all oil droplets in the introduced fluid, regardless of size and rising velocity, will theoretically travel to and coalesce into an oil layer at the top of the vessel 2. Because separated water is not removed at the top, the prior problem of oil carryover into the water effluent is avoided. Instead, the water spills radially over the overflow weir 8, flows radially and downward through an annulus 10, then is removed adjacent the bottom 6 through one or more outlets 12. The separated oil is removed through an outlet 11 adjacent an upper portion of the vessel 2. Because a semiradial flow pattern is induced in the annulus 10, additional separation of any oil carried over the overflow weir 8 will occur. However, any flow nonidealities will be minimized because of the radial type flow pattern.

Figure 2:
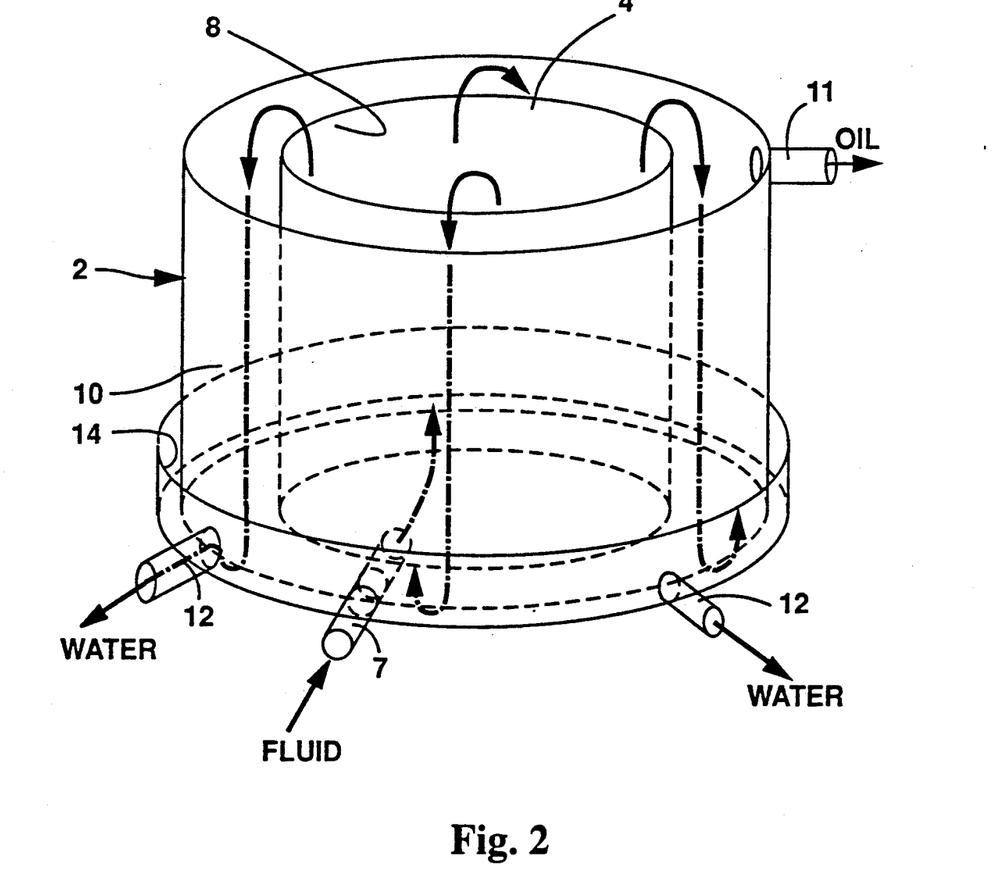
FIG. 2 is a schematic perspective view of another embodiment of a radial flow separator of the present invention.

To improve the flow distribution, the water can be removed at multiple points rather than at a single outlet. Alternately, an annular, lower radial outlet 14 as shown in FIG. 2 can be used, to further improve flow distribution. FIG. 2 shows the outlet 14 as an external water collection lip; however, to minimize fabrication and support problems, this could simply be an internal weir, circumferentially welded to the vessel 2.

The up/down radial flow separator of FIGS. 1 and 2 exhibits a number of advantages over conventional separator designs. It could utilize a center inlet with the bottom of the vessel acting as a splash plate leading into a vertical upflow configuration, which is theoretically capable of achieving oil removal efficiencies of 100%. It alleviates the oil carryover problem associated with prior vertical upflow configurations by using a second, radial/vertical downflow zone. It achieves higher volumetric utilization efficiencies by the use of the cylindrical baffle and radial overflow and radial under flow weirs. It is mechanically simple and can be easily fabricated.

The inventors have found that one of the keys to achieving high efficiencies in a separator is to assure that the smallest oil droplets are able to coalesce into the oil pad before being caught in the downward velocity field in the outer annulus or in the velocity field created by the exiting fluids of heavier specific gravities. In order to facilitate coalescence and provide the advantages of the up/down radial flow separator, the inventors have combined the unidirectional flow of the up/down radial flow separator with cyclonic flow described in the following detailed description.

Figure 3:
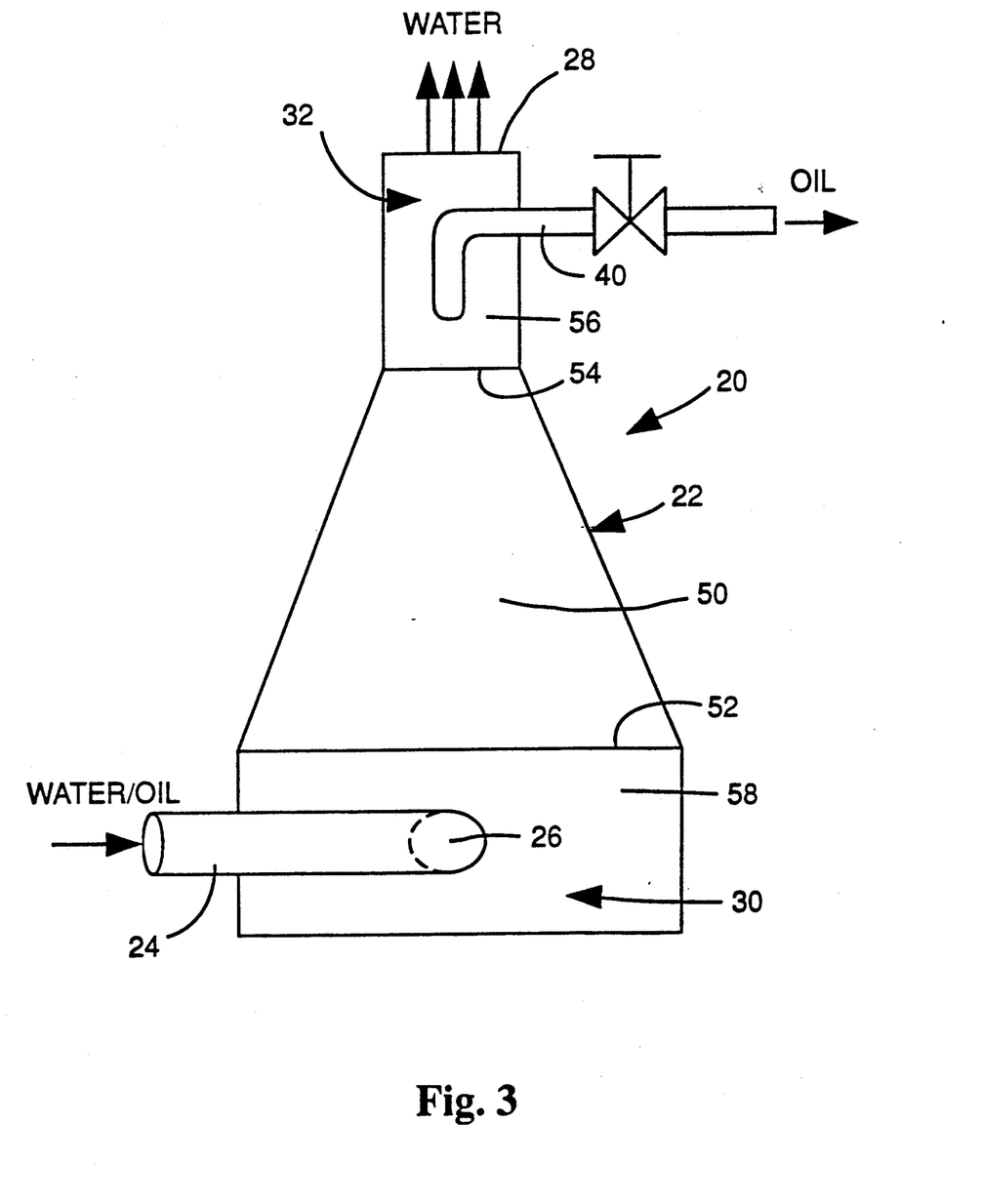
FIG. 3 is a schematic diagram of an embodiment of the separator of the present invention having an axial outlet conduit.

FIG. 3 presents an alternate embodiment of the apparatus and method of the present invention (hereinafter collectively referred to as "separator"), generally designated 20, for separating flowing immiscible fluid phases of different specific gravities. Although the separator 20 is described herein as used with oil and water, it is intended to be understood that the separator 20 can be used to separate virtually any fluids of different specific gravities which have fluid properties similar to emulsions or immiscible fluids. Further, although the invention is described broadly as a separator, it is intended to be understood that the invention also functions as a coalescer, i.e., it coalesces the droplets of oil (i.e., the fluid having the lighter specific gravity in the emulsion) as the fluids are centrifugally and centripetally separated.

Referring to FIG. 3, the separator 20 can be generally described as comprising an elongate conduit 22 and flow device 24. The elongate conduit 22 has a tangential inlet 26 for receiving incoming fluids, an outlet 28 for discharging separated fluids, a first end 30, and an open second end 32. The outlet 28 is formed by the open second end 32. The inlet 26 is longitudinally spaced away from the outlet 28 of the elongate conduit 22.

The flow device 24 is used for creating cyclonic flow of the fluid from the tangential inlet 26 through the outlet 28 of the elongate conduit 22 in order to centrifugally separate the fluids so that the separated fluids flow concentrically through the outlet. That is, the centrifugal forces created by the cyclonic flow of the fluid through the elongate conduit 22 force the fluid(s) of heavier specific gravity toward the outside wall and the fluid(s) of lighter specific gravity toward the center of the elongate conduit 22.

Preferably, the flow device 24 includes a diverter plate, baffle, or other deflector or guide to direct the incoming fluid circumferentially around the inside of the elongate conduit 22. The directing device can be internal or external to the elongate conduit 22. More preferably, the flow device 24 includes an inlet conduit connected to the inlet 26 and extending about tangentially to the elongate conduit 22 in order to direct fluid flowing from the inlet 26 about tangentially to the inside of the elongate conduit 22. The inlet conduit 24 can extend tangentially inside the elongate conduit 22, outside the elongate conduit 22, or both. In the preferred embodiment of the separator 20, the inlet conduit is connected to and extends tangentially away from the wall of the elongate conduit 22, as exemplified in FIG. 3.

The separator 20 can include an axial outlet conduit 40 of smaller diameter than the elongate conduit second end 32. The axial outlet conduit 40 acts as a finder tube and extends into the second end 32 of the elongate conduit 22 for receiving and discharging the separated or coalesced fluid of lighter specific gravity from the second end 32 of the elongate conduit 22. The axial outlet conduit 40 in the preferred embodiment will extend concentrically into the elongate conduit second end 32 and is sealingly connected to the elongate conduit. The axial outlet conduit 40 can be used to connect the discharged oil stream to a storage tank, processing system, etc.

The axial outlet conduit 40 should have an internal diameter approximately equal to the largest anticipated diameter of the coalesced and separated oil stream. In order to achieve a desired removal of the oil stream, the fluid velocity in the outlet conduit 40 should be approximately the same as the fluid velocity or flow of the water or other fluid passing around the outlet conduit 40.

The inventors have found that improved separation is achieved by taking more fluid through the outlet conduit 40 than by not taking enough, and therefore, in the prototype separator 20, the outlet conduit 40 have been sized for 1.5 times isokinetic flow, i.e., 150 percent of isokinetic flow. Also, as previously mentioned, in order to minimize any disturbance of the coalesced and separated fluid, the axial outlet conduit 40 should be small with respect to the internal diameter of the elongate conduit second end 32.

Figure 4:
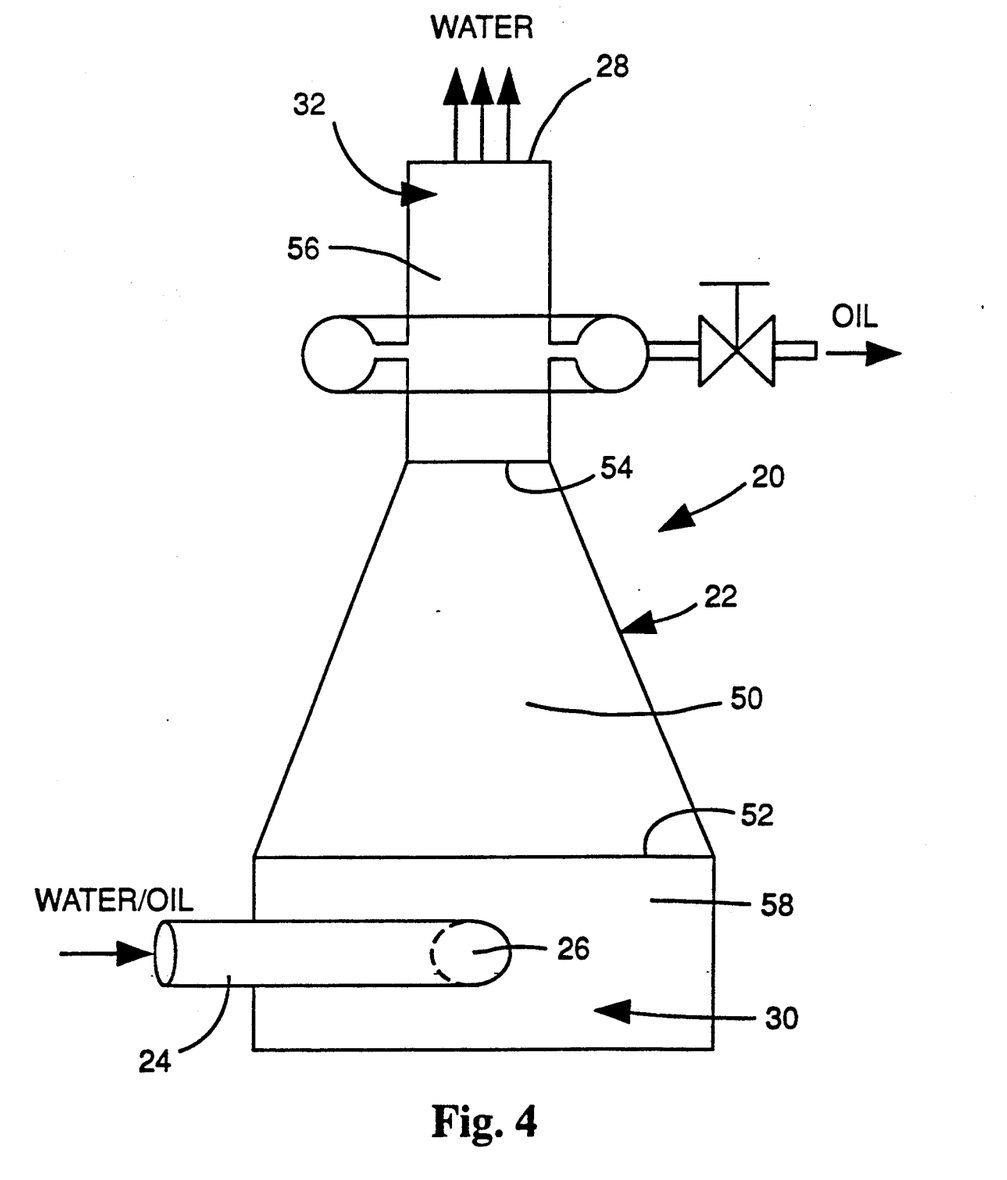
FIG. 4 is a schematic diagram of another embodiment of the separator of the present invention having a radial outlet conduit.

Referring to the embodiment of FIG. 4, the separator 20 can include a transverse outlet conduit 42. The transverse outlet conduit 42 is connected about transversely through and into the second end 32 of the elongate conduit 22 for receiving and discharging the separated fluid of heavier specific gravity (e.g., water) from the second end 32 of the elongate conduit 22. In the preferred embodiment, the transverse outlet conduit 42 is a toroidal conduit which circumscribes the second end 32 of the elongate conduit 22 and is in continuous circumferential fluid communication with the interior of the elongate conduit second end 32. Therefore, the transverse outlet conduit 42 is able to take advantage of the centrifugal forces acting on the separated fluid of heavier specific gravity and use the centrifugal forces to dispose of the fluid(s) of heavier specific gravity, i.e., the centrifugal forces acting on the fluid force it into the toroid and conduit of the transverse outlet conduit 42. The opening from the elongate conduit 22 into the transverse outlet conduit 42 should be shaped to guide the fluid of heavier specific gravity into the transverse conduit 42 without disturbing the flow pattern of the coalesced stream of lighter specific gravity fluid. The transverse outlet conduit 42 can be used to connect the discharged fluids to a storage tank, disposal system, or other processing system.

Although not illustrated, the separator 20 can include both an axial outlet conduit 40 and a transverse outlet conduit 42. Such a separator 20 can be used to separate fluids of three or more different specific gravities, e.g., the separated fluid(s) of lightest specific gravity, such as oil would be discharged through the axial outlet conduit 40; the separated fluid(s) of intermediate specific gravity, such as water, would be discharged through the outlet 28 of the elongate conduit 22; and the separated fluid(s) of heaviest specific gravity, such as a fluid laden with solids or particulate matter, would be discharged through the transverse outlet conduit 42. The embodiments of FIGS. 3 and 4, which use both the axial outlet conduit 40 and the transverse outlet conduit 42, can be used as a stand alone separator 20, i.e., the elongate conduit 22 will be used without an outer surrounding tank, although it is recognized that such embodiments can also be used when the elongate conduit 22 is used inside a tank, as further discussed below.

When the separator 20 is a stand alone separator, the elongate conduit outlet 28 will be connected via discharge piping or some other form of conduit (not illustrated) to a downstream separator, to a storage tank, or other processing system. If neither the axial nor transverse outlet conduit 40, 42 is used, the separator 20 functions more as a coalescer and the coalesced discharge stream from the outlet 28 will normally be connected to a conventional separator for final separation. The coalesced stream exiting from the separator 20 should be maintained at sufficiently low velocities through the discharge piping to prevent remixing of the coalesced oil with the other fluids in the discharge piping.

Although the elongate conduit 22 can be a conduit of constant diameter (exemplified in FIG. 5), preferably the elongate conduit 22 includes a hollow, frusto-conical accelerator 50, as best seen in the example embodiments of FIGS. 3 and 4. The larger end 52 of the accelerator 50 adjoins the first end 30 of the elongate conduit 22. The smaller end 54 of the accelerator 50 adjoins the second end 32 of the elongate conduit 22. The frusto-conical shape of the accelerator 50 increases the angular velocity of the fluid flowing into the elongate conduit 22, which enhances the separation and coalescence of the fluids. Although the frusto-conical shape of the accelerator 50 can comprise the entire elongate conduit 22, preferably, the second end 32 of the elongate conduit 22 includes a frusto-conical or cylindrical neck 56 connected to and extending from the smaller end 54 of the accelerator 50. The internal diameter of the neck 56 should be of about equal diameter to the internal diameter of the smaller end 54 of the accelerator 50 in order to facilitate a smooth transition of the cyclonic flow from the accelerator 50 into the neck 56. The neck 56 maintains the accelerated angular velocity of the fluid and enhances the coalescence and separation of the fluids. In the prototype separator 20, the neck 56 is sealingly connected coaxially and concentrically with the accelerator 50.

In the preferred embodiment, the elongate conduit 22 also includes a cylindrical base 58 connected to the larger end 52 of the accelerator 50. The internal diameter of the base 58 should be of about equal diameter to the internal diameter of the larger end 52 of the accelerator 50 in order to facilitate a smooth transition of the cyclonic flow from the base 58 into the accelerator 50. In the prototype separator 20, the base 58 is sealingly connected coaxially and concentrically with the accelerator 50.

As illustrated in FIGS. 3 and 4, the inlet conduit 24 is tangentially connected to the base 58. It is important to allow the fluid to gradually accelerate to higher angular velocities to keep the shear forces in the fluid at a minimum. Excessive shear forces prevent the fluid from coalescing properly. Although not illustrated, multiple flow devices or tangential inlet conduits 24 can be spaced around the first end 30 or base 58 of the elongate conduit 22 in order to reduce the shear forces produced in a feed stream as it enters the elongate conduit 22 and transitions into the cyclonic flow pattern. Multiple inlet flow devices 24 reduce the tangential fluid velocity at the inlet 26 and allow the fluid to more smoothly transition to a cyclonic flow.

Figure 5:
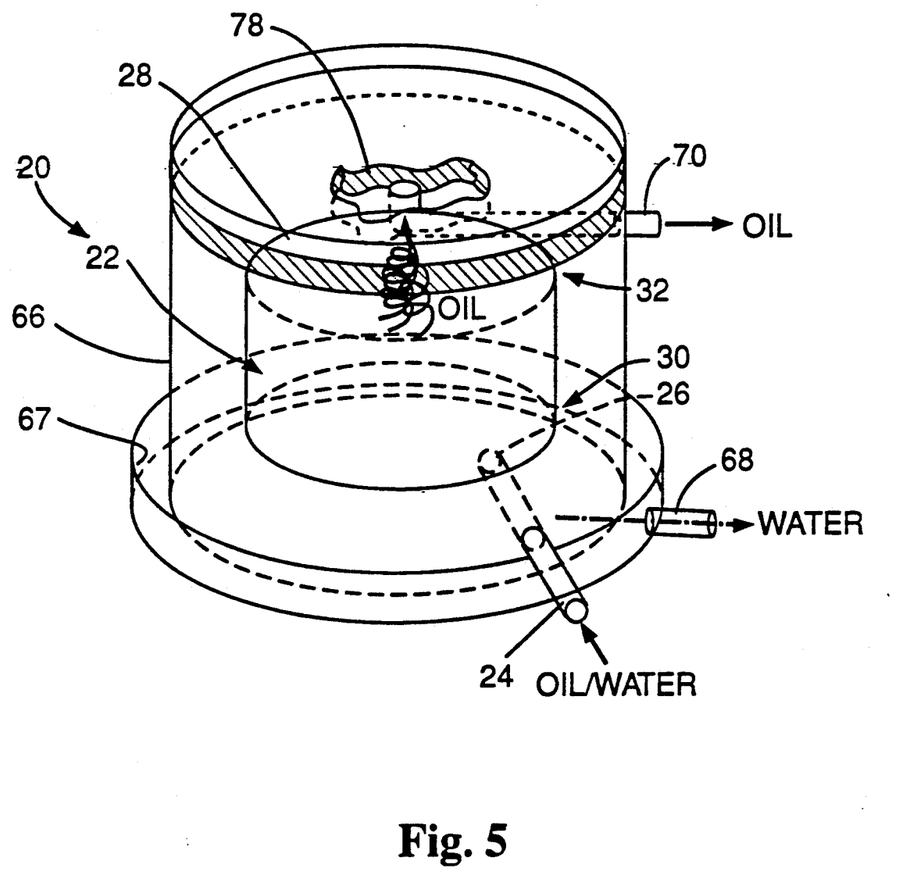
FIG. 5 is a schematic diagram of another embodiment of the separator of the present invention in which the elongate conduit is surrounded by an outer tank.
Figure 6:
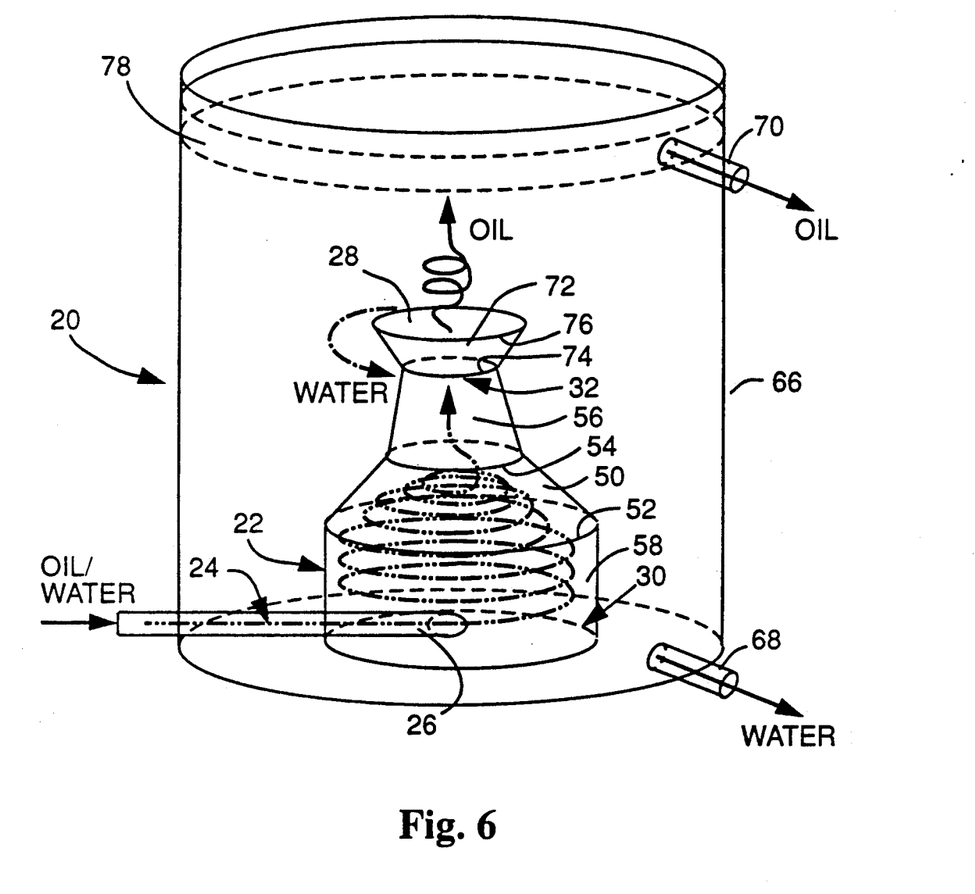
FIG. 6 is a schematic diagram of another embodiment of FIG. 5.

Referring to the example of FIG. 6, in another embodiment the separator 20 includes an outer tank 66 surrounding the elongate conduit 22. The tank 66 should be of greater height than the elongate conduit 22. The elongate conduit 22 is oriented and connected about vertically in the tank 66 with the first end 30 of the elongate conduit 22 oriented towards the bottom of the tank 66. In the prototype separator 20, the elongate conduit 22 is positioned concentrically and coaxially in the tank 66 with the first end 30 of the elongate conduit 22 connected to the bottom of the tank 66. A lower outlet 68 is provided near the bottom of the tank 66 to discharge the separated fluid of heaviest specific gravity, which will normally be water. Multiple lower outlets 68 can be spaced around the lower end of the tank 66 to improve the flow distribution of the water from the tank 66. An underflow water weir (in FIG. 5) can be used to enhance separation. Such a water weir includes a concentric, annular channel 67 around the outside of the base of the tank 66 which is in fluid communication with the interior bottom of the tank and connecting the water outlets 68 to the outside of the annular channel; or by extending an annular weir (not illustrated) downward from the inside wall of the tank 66 to near the bottom of the tank 66 and connecting the lower outlets 68 through the wall of the tank 66 below the weir.

An upper outlet 70 is provided at the upper end of the tank 66. The upper outlet 70 is used for discharging the fluid or fluids of lighter specific gravity, such as oil, from the tank 66. The upper outlet 70 can simply be a pipe or conduit, as illustrated in FIGS. 5 and 6, or can be a skimming or suction device in contact with the oil layer 78.

When used with the tank 66, the elongate conduit 22 functions as a coalescer, i.e., it coalesces the oil in order to facilitate a higher efficiency of separation. Referring to FIG. 6, when used with the tank 66 the elongate conduit 22 can include any or all of the features previously discussed with the embodiments of FIGS. 3 and 4, i.e., the directing means or inlet conduit 24, axial outlet conduit 40 or transverse outlet conduit 42 (if desirable for a special application such as three-phase fluid separation), accelerator 50, frusto-conical or cylindrical neck 56 and cylindrical base 58. These features will be used in the same manner and serve generally the same functions as previously discussed.

The separator 20 further includes a hollow frusto-conical diffuser 72 with a smaller end 74 of the diffuser 72 connected to the elongate conduit 22 and a larger end 76 forms the outlet 28 of the elongate conduit 22. Preferably, the smaller end 74 of the diffuser 72 is connected to the opposite end of the neck 56 from the accelerator 50, as illustrated in FIG. 6. The diffuser 72 can be used with any combination of the elongate conduit 22, accelerator 50, neck 56, or base 58. In the prototype separator 20, as illustrated in FIG. 6, the diffuser 72, neck 56, accelerator 50, and cylindrical base 58 are assembled in combination. The diffuser serves to decelerate the angular velocity of the separated and coalesced oil and water to improve the separation efficiency and effectiveness of the elongate conduit 22/tank 66 combination.

In operation, the separator 20 of FIGS. 5 and 6 achieves a significant degree of coalescence before the oil droplets reach the oil pad 78 because of the cyclonic flow field. The cyclonic flow field induces additional separation forces which cause the small oil droplets to migrate to the center of the elongate conduit 22. A core of oil forms at the center of the elongate conduit 22 as the droplets coalesce. This core rises to the top of the elongate conduit and is coalesced into the oil pad 78 before any small oil droplets can be carried over the outlet 28 of the elongate conduit 22 and caught in the downward bulk velocity flow field. The coalescence of the small droplets into the oil core increases their effective diameter. This greatly increases droplet volume, and hence, buoyancy force and rise rate, which further increases the tendency of the coalesced droplets to overcome the bulk flow field and prevent carryover into the water outlet.

As the fluid passes through the elongate conduit 22, the denser water migrates to the outside of the elongate conduit 22. In FIG. 6, the diffuser or frusto-conical decelerator 72 reduces the cyclonic velocity and provides a smooth transition for the coalesced fluid leaving the elongate conduit 22 so that the coalesced fluid is not redispersed by mixing of the cyclonic flow leaving the elongate conduit at the outlet 28 with the relatively quiescent fluid in the surrounding tank 66.

An oil skimmer (not illustrated) or outlet 70 can be placed at the center of the tank 66 to further induce flow of oil to the center of the tank 66 and further reduce dispersion of the coalesced oil into the water. Because of the cyclonic flow field, the downward components of velocity in the water flowing in the tank 66 outside of the elongate conduit 22 will be small. This will also further reduce the tendency for the oil to be carried downward, even if it is carried out of the elongate conduit 22 with the water. The cyclonic flow field causes the water to gently swirl to the bottom of the tank 66 in widening circles before it exits through the lower outlets 68.

Figure 7:
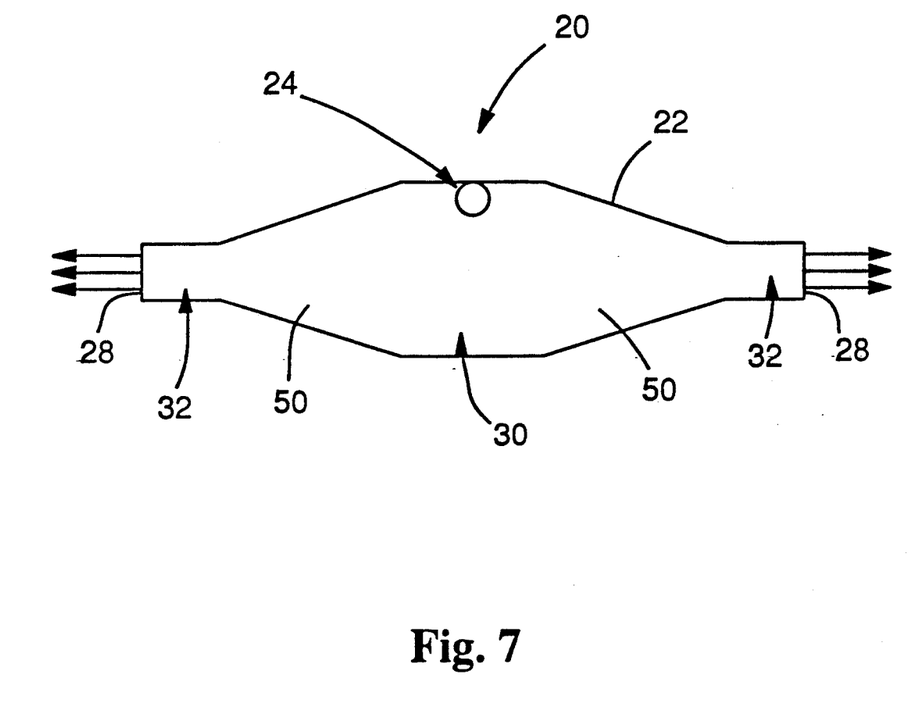
FIG. 7 is a schematic diagram of compact embodiment of the separator of the present invention which has an outlet at each of two second ends of an elongate conduit of FIG. 5.

In the separator 20 of FIGS. 5 and 6, the elongate conduit 22 should be positioned with the longitudinal axis of the elongate conduit as nearly vertical as possible and about coaxially with the tank 66. In the embodiment of FIGS. 3 and 4, i.e., when the elongate conduit 22 is used without an outer tank 66, the elongate conduit 22 can be oriented in virtually any direction. For example, in separating oil and water, the outlet 28 can be oriented in an upward position; if separating solids from a lighter fluid, it can be more efficient to orient the outlet 28 in a downward position. The separator 20 of FIG. 7 shows a compact embodiment of the present invention in which the elongate conduit 22 provides two branches for separating the flowing fluid. As shown in FIG. 7, the geometric dimensions of the elongate conduit may be approximately bilaterally symmetric about the inlet conduit 24. Provided that any downstream piping and flow control devices are also arranged to provide equal backpressure on each fluid branch on the elongate conduit 22, then the fluid flow rate through each branch of the elongate conduit will be approximately equal. Fluid entering the first end 30 via the inlet conduit 24 flows cyclonically within the elongate conduit 22 and divides into two streams or flow branches in which the dispersed fluid coalesces and separates due to the action of the cyclonic flow field. The two coalesced and separated fluid streams exit the separator via either of two second ends 32.

While presently preferred embodiments of the invention have been described herein for the purpose of disclosure, numerous changes in the construction and arrangement of parts and the performance of steps will suggest themselves to those skilled in the art, which changes are encompassed within the spirit of this invention as defined by the following claims.

What is claimed is:

1. An elongate conduit separator for separating flowing immiscible fluids of different specific gravities, comprising:
    means for enabling shear forces sufficiently low to provide coalescing, including:
    an inlet for receiving incoming fluids at a first end;
    an outlet for discharging separated fluids at a second end;
    cyclonic flow means for creating cyclonic flow of the fluids from the inlet through the outlet of the elongate conduit in order to centrifugally separate the fluids; and
    velocity increasing flow means for gradually increasing angular velocity of the flowing fluids between the inlet and the outlet.

2. A separator of claim 1 wherein the flow means comprises means for directing fluid flowing from the inlet about circumferentially around the inside of the elongate conduit.

3. A separator of claim 1 wherein the flow means comprises an inlet conduit connected to the inlet and extending about tangentially to the elongate conduit in order to direct fluid flowing from the inlet about tangentially to the inside of the elongate conduit.

4. A separator of claim 1 including an axial outlet conduit of smaller diameter than the elongate conduit, the outlet conduit connected about axially in the second end of the elongate conduit for receiving and discharging the separated fluid of lighter specific gravity from the second end of the elongate conduit.

5. A separator of claim 4 including a transverse outlet conduit, connected about transversely through the second end of the elongate conduit, for receiving and discharging the separated fluid of heavier specific gravity from the second end of the elongate conduit.

6. A separator of claim 1 wherein the elongate conduit comprises a hollow frusto-conical accelerator, the larger end of the accelerator adjoining the first end of the elongate conduit, the smaller end of the accelerator adjoining the second end of the elongate conduit.

7. A separator of claim 6 wherein the second end of the elongate conduit comprises a cylindrical neck connected to and extending from the smaller end of the accelerator, the neck being of about equal diameter to the smaller end of the accelerator.

8. A separator of claim 7 wherein the first end of the elongate conduit comprises a cylindrical base connected to the larger end of the accelerator, the base being of about equal diameter to the larger end of the accelerator.

9. A separator of claim 1 including an outer tank surrounding the elongate conduit, the tank being of greater height then the elongate conduit and having on oil outlet at the upper end of the tank and at least one water outlet at the lower end of the tank, the elongate conduit being connected about vertically in the tank with the first end of the elongate conduit oriented towards the bottom of the tank.

10. A separator of claim 9 wherein the cyclonic flow means comprises means for directing fluid flowing from the inlet about circumferentially around the inside of the elongate conduit.

11. A separator of claim 9 wherein the cyclonic flow means comprises an inlet conduit connected to the inlet and extending about tangentially to the elongate conduit separator in order to direct fluid flowing from the inlet about tangentially to the inside of the elongate conduit.

12. A separator of claim 9 wherein the velocity increasing flow means comprises a hollow frusto-conical accelerator, the larger end of the accelerator adjoining the first end of the elongate conduit separator, the smaller end of the accelerator adjoining the second end of the elongate conduit separator.

13. A separator for separating flowing fluids of different specific gravities, comprising:
    means for enabling shear forces sufficiently low to provide coalescing, including:
    an elongate conduit having an inlet for receiving incoming fluids, an outlet for discharging separated fluids, a first end, and an open second end; the outlet being formed by the open second end; the inlet being longitudinally spaced away from the outlet on the conduit;
    an inlet conduit connected to the inlet and extending about tangentially to the elongate conduit in order to direct fluid flowing from the inlet about tangentially to the inside of the elongate conduit; and in which the elongate conduit comprises:
    a hollow frusto-conical accelerator;
    a cylindrical neck connected to and extending from a smaller end of the accelerator, the neck being of about equal diameter to the smaller end of the accelerator; and
    a cylindrical base connected to the larger end of the accelerator, the base being of about equal diameter to the larger end of the accelerator.

14. A separator of claim 13 including an axial outlet conduit of smaller diameter than the elongate conduit, the outlet conduit extending about axially in the neck of the elongate conduit for receiving and discharging the separated fluid of lighter specific gravity from the neck of the elongate conduit.

15. A separator of claim 13 including a transverse outlet conduit, connected about transversely through the neck of the elongate conduit, for receiving and discharging the separated fluid of heavier specific gravity from the neck of the elongate conduit.

16. A method for separating flowing fluids of different specific gravities, comprising:

enabling shear forces sufficiently low to provide coalescing by:
- (a) introducing the fluids through an inlet at a first end of an elongate conduit by a flow means for creating cyclonic flow of the fluids from the inlet through the elongate conduit and through an outlet at a second end of the elongate conduit, wherein the conduit is shaped for gradually increasing the angular velocity of the fluids flowing between the inlet and the outlet; and
- (b) concentrically discharging the separated fluids through the outlet of the elongate conduit.

17. A method of claim 16 wherein step (a) comprises introducing the fluids into the elongate conduit through an inlet conduit connected about tangentially to the elongate conduit in order to direct fluid flowing from the inlet about tangentially to the inside of the elongate conduit.

18. A method of claim 16 including:

discharging the separated fluid of lighter specific gravity through an axial outlet conduit of smaller diameter than the elongate conduit connected about axially in the second end of the elongate conduit;

discharging the separated fluid of heavier specific gravity through a transverse outlet conduit connected about transversely through the second end of the elongate conduit; and discharging the separated fluid of intermediate specific gravity through the elongate conduit outlet.

19. A method for separating oil and water, comprising the steps:

enabling shear forces sufficiently low to provide coalescing by:
- (a) cyclonically flowing the oil and water from an inlet at a first end of an elongate conduit through an outlet at a second end of the elongate conduit while gradually increasing the angular velocity of the flowing oil and water between the inlet and the outlet of the elongate conduit for centrifugally separating the oil and water; and
- (b) concentrically discharging the oil and water through the outlet of the elongate conduit.

20. A separator for separating oil and water, comprising:

means for enabling shear forces sufficiently low to provide coalescing, including:

an elongate conduit comprising:

a cylindrical base having an inlet at the first end for receiving oil and water and having a second end;

a first hollow frusto-conical accelerator having a smaller end and a larger end of equal diameter to the cylindrical base, the larger end being connected to the second end of the cylindrical base;

a second hollow frusto-conical accelerator having a smaller end and a larger end of equal diameter to the smaller end of the first hollow frusto-conical accelerator, the larger end being connected to the smaller end of the first hollow frusto-conical accelerator;

a diverging section having a larger end and a smaller end of equal diameter to the smaller end of the second hollow frusto-conical accelerator, the smaller end being connected to the smaller end of the second hollow frusto-conical accelerator; and an inlet conduit connected to the inlet of the cylindrical base and extending about tangentially to the cylindrical base in order to divert oil and water flowing from the inlet about tangentially to the inside of the cylindrical base; and an outer tank surrounding the elongate conduit, the tank being of greater height than the elongate conduit, and having an oil outlet at the upper end of the tank and at least one water outlet at the lower end of the tank, the elongate conduit being connected about vertically in the tank with the first end of the cylindrical base oriented toward the bottom of the tank.

* * * * *